United States Patent [19]

Kinjo et al.

[11] Patent Number: 4,477,843
[45] Date of Patent: Oct. 16, 1984

[54] SYSTEM FOR STILL OR SLOW-MOTION REPRODUCTION OF TELEVISION PICTURES

[75] Inventors: Hisao Kinjo; Kazuo Tatsuguchi, both of Yokohama, Japan

[73] Assignee: Victor Company of Japan, Ltd., Yokohama, Japan

[21] Appl. No.: 326,700

[22] Filed: Dec. 2, 1981

Related U.S. Application Data

[63] Continuation of Ser. No. 88,333, Oct. 26, 1979, abandoned.

[30] Foreign Application Priority Data

Oct. 27, 1978 [JP] Japan .................... 53-132273

[51] Int. Cl.³ .................... H04N 5/76; H04N 5/78
[52] U.S. Cl. .................... 358/342; 360/10.1
[58] Field of Search .................... 358/312, 335, 342; 360/10.1, 11.1, 35.1; 369/43, 47, 48, 49

[56] References Cited

U.S. PATENT DOCUMENTS

| | | | |
|---|---|---|---|
| 3,924,062 | 12/1975 | Broadbent | 360/11 X |
| 4,040,098 | 8/1977 | Beeson | 360/10 X |
| 4,058,840 | 11/1977 | Kasprzak | 360/11.1 X |
| 4,130,834 | 12/1978 | Mender et al. | 360/35.1 |
| 4,133,009 | 1/1979 | Kittler et al. | 360/11.1 X |
| 4,142,209 | 2/1979 | Hedlund et al. | 358/342 |
| 4,161,001 | 7/1979 | Sakamoto | 360/14 |
| 4,161,753 | 7/1979 | Bailey et al. | 358/342 X |
| 4,761,001 | 7/1979 | Sakamato | 360/14 |

OTHER PUBLICATIONS

A Random Acess System Adapted for the Optical Video Disc: Its Impact on Information Retrieval. Mathieu, SMPTE, Journal (Feb. 77) vol. 86, pp. 80–83.

A New Small–Size Magnetic Disc Memory for Still Picture Recording, Uno et al., IEEE Transaction on Consumer Electronics, vol. CE–22, No. 4, pp. 293–301, Nov. 76.

*Primary Examiner*—Aristotelis M. Psitos
*Attorney, Agent, or Firm*—Louis Bernat

[57] ABSTRACT

Apparatus reproduces a normally recorded video signal in a special mode, such as slow motion and stop motion; for example, a plurality of successive TV fields are recorded in each complete revolution of a rotary medium having a spiral track. One field is selected from the revolution and is re-recorded or stored in a memory. That one field may then be played back repeatedly to give the special mode reproduction. A signal processing means processes the repeated playback.

9 Claims, 70 Drawing Figures

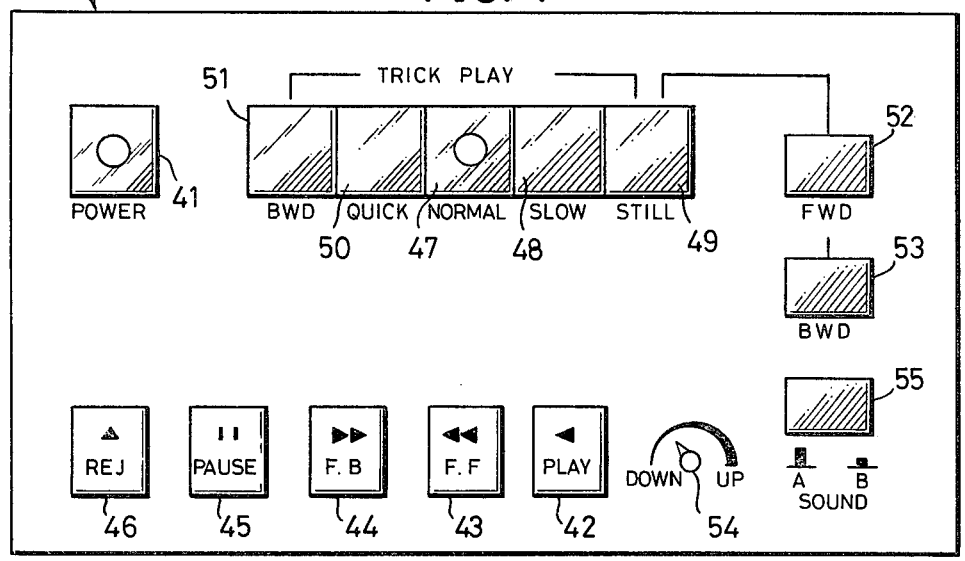
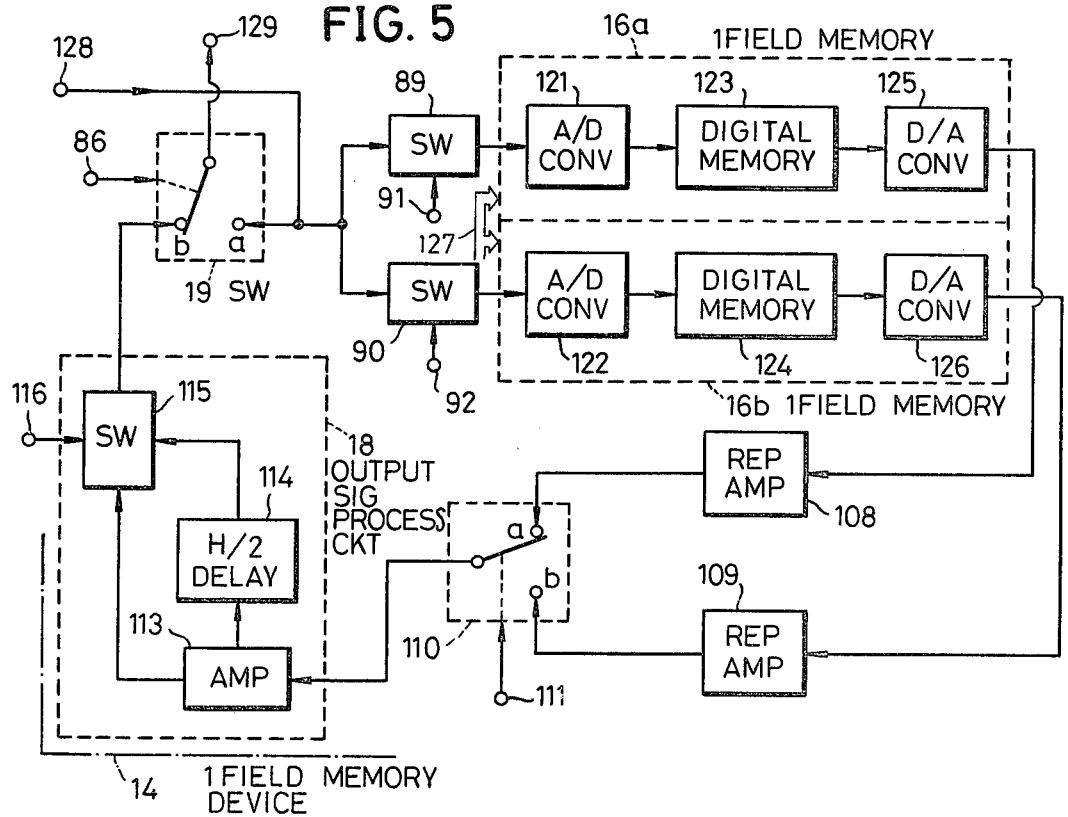

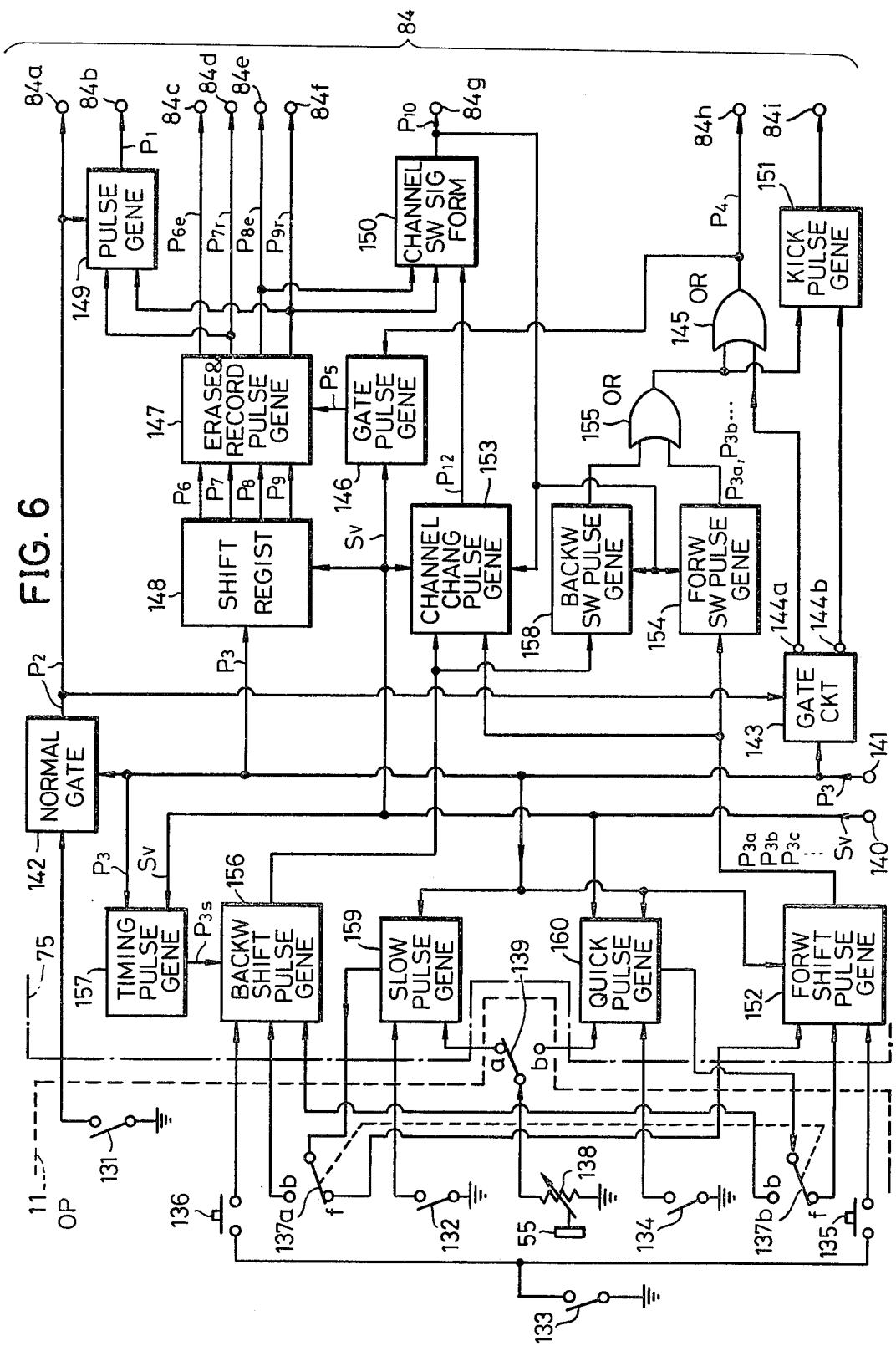

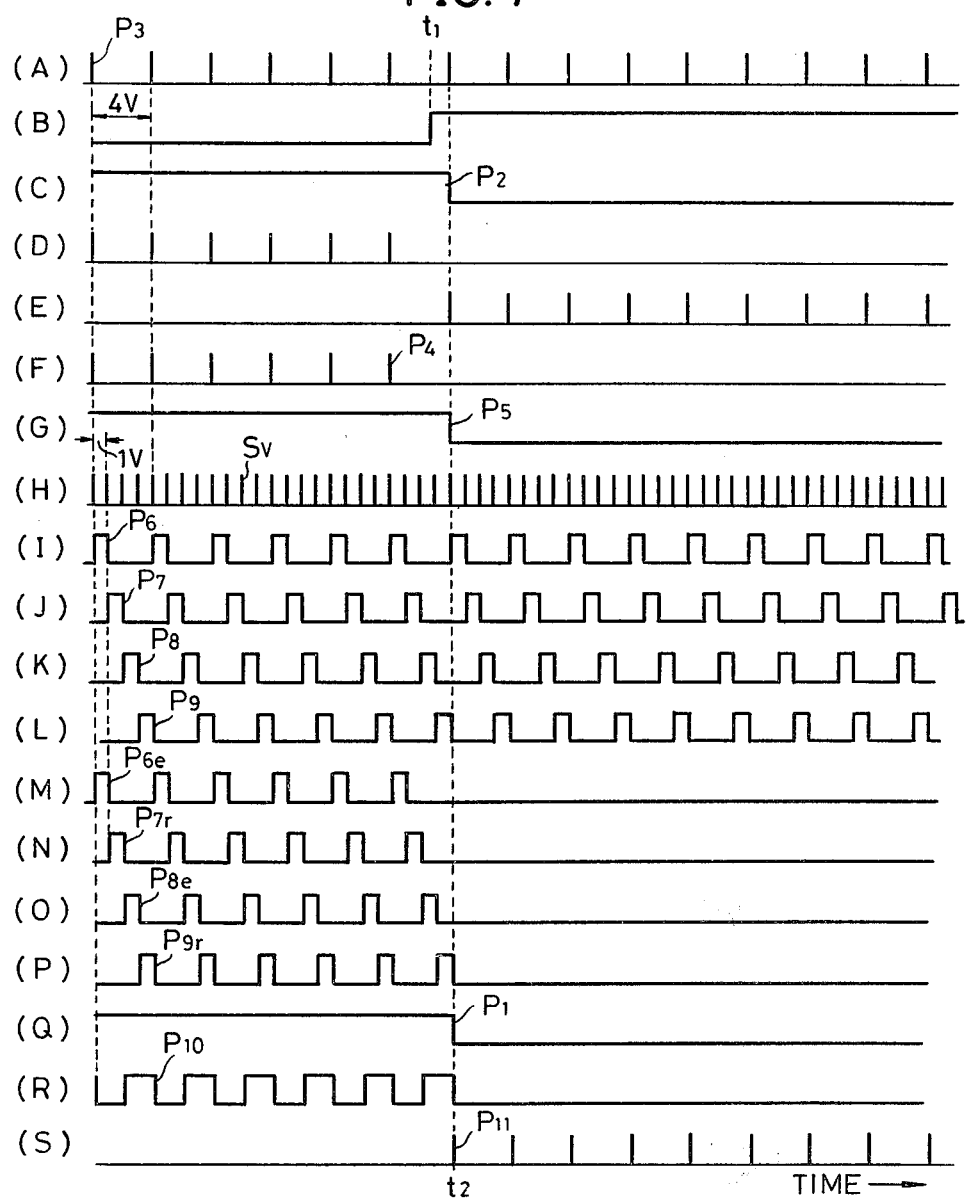

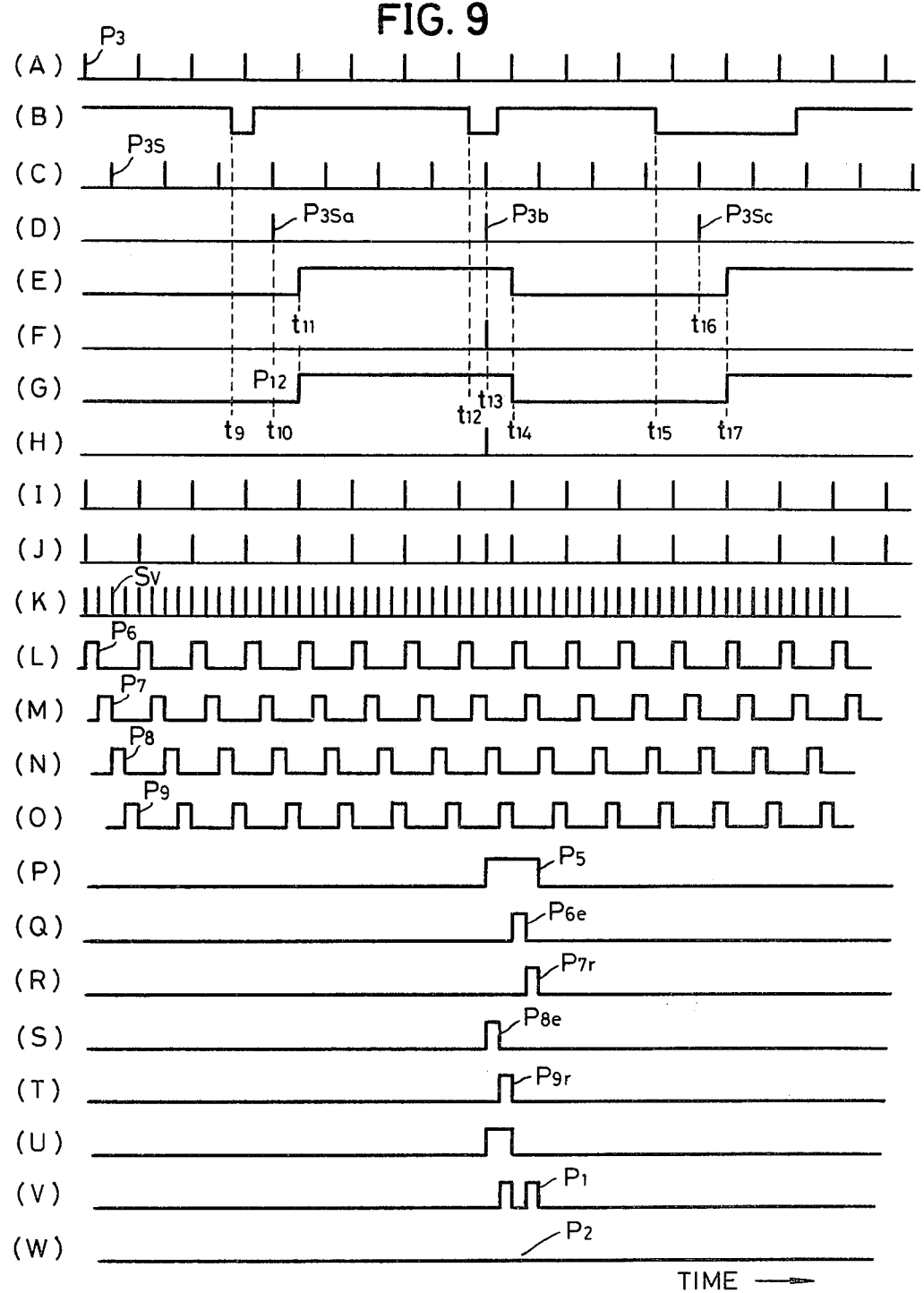

SYSTEM FOR STILL OR SLOW-MOTION REPRODUCTION OF TELEVISION PICTURES

This is a continuation of application Ser. No. 88,333, filed Oct. 26, 1979, and now abandoned.

BACKGROUND OF THE INVENTION

The present invention relates generally to special reproducing systems in apparatus for reproducing rotary recording mediums. More particularly, the present invention relates to a special reproducing system in an apparatus for reproducing, by means of a reproducing transducer, a video signal from a rotary recording medium on which the video signal has been recorded along a spiral track, at the rate of two or more fields per track turn. The reproducing transducer of the system traces each track turn a number of times to accomplish a special reproduction free from any unnatural motion of the reproduced picture.

In general, in a system for recording a television video signal on a rotating recording medium, the fewer the number of fields of the video signal recorded per revolution of the rotating recording medium, the higher the required rotational speed of the rotating recording medium. When the rotational speed is high, the system is subjected to unduly severe mechanical conditions so that vibration occurs and/or automatic control becomes difficult. Moreover, the recording capacity of the recording medium is reduced.

On the other hand, the greater the number of fields of the video signal recorded per revolution of the rotating recording medium, the lower is the required rotational speed of the rotating recording medium. Thus, when a large number of fields are recorded per revolution, the system is not subjected to excessively severe mechanical conditions. Furthermore, the recording capacity of the recording medium becomes large. On the other hand, however, in the case where the signal is recorded on the recording medium as a variation in geometrical shape and is thereafter reproduced as capacitance variation or optical variation, the wavelength of the signal recorded on the recording medium becomes short so that the reproducing element becomes unable to reproduce satisfactorily.

In view of the above described circumstances, it is most desirable to record a video signal at the rate of four fields, that is, two frames, per revolution of the rotating recording medium.

In this connection, a novel "Information signal recording and reproducing system" has been described in U.S. patent application Ser. No. 785,095 (filed Apr. 6, 1977) and assigned to the assignee of the present application and now U.S. Pat. No. 4,331,976. A continuation-in-part of this application was filed as U.S. patent application Ser. No. 33,324, filed Apr. 25, 1979 and now U.S. Pat. No. 4,315,283. The system described by these two applications has already been reduced to practice. In accordance with this system, a video signal is recorded along a track of spiral form as a geometrical shape variation, without a reproducing stylus guide groove. The track is on a rotating recording medium having a flat surface. Since there is no guide groove in the rotating recording medium, the reproducing stylus can move smoothly from one track turn to another at the time of still-picture, slow-motion, or quick-motion reproduction. Accordingly, in spite of the use of a reproducing stylus in this system, special reproducing modes such as still-picture reproduction can be smoothly carried out.

However, in the case where still-picture reproduction is carried out by repeatedly reproducing the same track turn, if a number of fields (for example, four fields as mentioned above) is recorded along the same track turn, the reproduced still-picture will not be perfectly still, but will appear unnatural and indistinct. More specifically, particularly where the information content is one of rapid motion, the position of a moving object at the starting point of a given track turn will differ considerably from its position at the terminal point of the same track turn in the reproduced picture. For this reason, when the same track turn is repeatedly reproduced, each moving object repeatedly undergoes reciprocal motion between these two different positions, and the reproduced image appears to flicker or vibrate. Also at the time of slow-motion reproduction when the same track turn is reproduced a plurality of times and then the reproducing element (stylus) shifts to the succeeding track turn, the reproduced picture will move unnaturally.

SUMMARY OF THE INVENTION

Accordingly, it is a general object of the present invention to provide a novel and useful system for special reproduction in a rotary recording medium reproducing apparatus, which system is capable of carrying out special reproduction so as to obtain excellent reproduced pictures of motions differing from the motion of a normal picture.

Another and specific object of the present invention is to provide a system, wherein, special modes of reproduction such as still reproduction or slow-motion reproduction is done by reproducing each track turn on a rotary recording medium a plurality of times. The video signal is recorded at the rate of two or more fields per track turn. Signals specific fields from among the two or more field signals reproduced from a single track turn are stored in a one-field memory device and are then read out. The read signals are used for picture reproduction. According to the system of the present invention, a good still picture or slow motion picture free from vibration can be produced even when the picture represented by the video information signal involves rapid motion.

Other objects and further features of the invention will be apparent from the following detailed description with respect to preferred embodiments of the invention when read in conjunction with the accompanying drawings.

BRIEF DESCRIPTION OF THE DRAWINGS

In the drawings:

FIG. 4 is a plan view showing the control panel of an operation device;

FIG. 5 is a block diagram showing another embodiment of a one-field memory device incorporated in the system of the present invention;

FIG. 6 is a block diagram showing one embodiment of the control pulse generation circuit in the block diagram in FIG. 2; and FIGS. 7(A) through 7(S), FIGS. 8(A) through 8(V), and FIGS. 9(A) through 9(W) are waveforms of signals at various parts in the block diagram shown in FIG. 6.

DETAILED DESCRIPTION OF THE INVENTION

Figure 1:
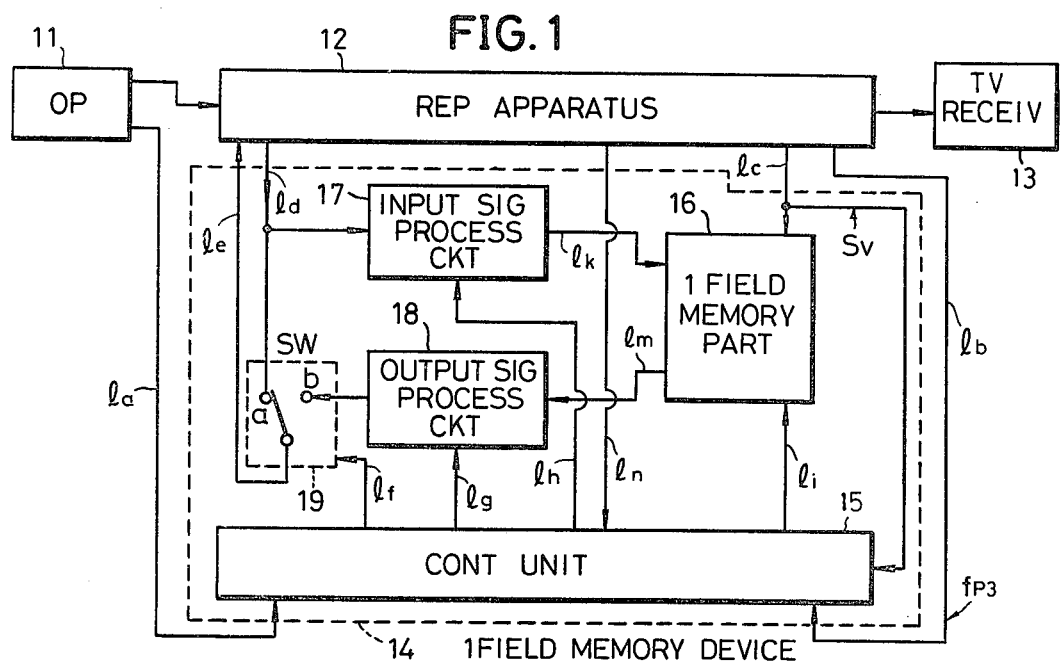
FIG. 1 is a block diagram showing the principle of one embodiment of a special reproducing system in an apparatus for reproducing video signals from a rotary recording medium according to the present invention.

The general features of the special reproducing system in an apparatus for reproducing video signals from a rotary recording medium according to the present invention are illustrated in FIG. 1. In this system, the operator uses an operation device 11 to turn ON and OFF a power source in the apparatus and to set the apparatus to various reproducing modes.

A reproducing apparatus 12 comprises a rotary driving part for rotating a disc which constitutes the rotary recording medium having video signals recorded thereon, at a predetermined rate. A carriage transfers a transducer, for reproducing recorded signals from the disc, in the radial direction of the disc at speeds conforming to reproducing modes. A signal processing circuit processes signals reproduced by means of the reproducing transducer. A tracking control part controls the reproducing transducer so as to trace the track of the disc accurately. A random access control part rapidly transfers the reproducing transducer to a desired track thereby to reproduce the desired track. A pulse generation circuit, generates control pulses required for performing the above described operations, and the like.

A video signal is recorded on the disc at the rate of two or more fields (four fields, in the present embodiment) per single track turn. One track turn corresponds to one revolution of the disc. Reference signals fp1 and fp2 are formed at either end of the track, and a reference signal fp3 at predetermined positions of each track.

The reproducing apparatus 12 reproduces the signal recorded on the disc in accordance with the reproducing mode set by the operation device 11, and the resulting reproduced signal is fed to a television receiver 13 thereby to reproduce picture and sound.

The one-field memory device 14 enclosed by a broken line comprises a control unit 15, such as a micro processer or micro computer, for performing a control operation on the basis of a signal supplied through a line la depending upon the reproducing mode set by the operation device 11. A one-field memory part 16 is composed of a plurality of one-field memories each adapted to store one field of the reproduced video signal from the reproducing apparatus 12 under control of the control unit 15, an input signal processing circuit 17, an output signal processing circuit 18, and a switching circuit 19.

The control unit 15 is supplied with the reproduced reference signal fp3 through a line lb, and with a vertical synchronizing signal SV through a line lc, both signals being produced from the reproducing apparatus 12. The control unit 15 supplies control signals to the input signal processing circuit 17 and the output signal processing circuit, respectively through lines lh and lg.

When the operation device 11 is set to a normal reproducing mode, a switching pulse is supplied from the control unit 15 through a line lf to the switching circuit 19. A moving contact of switch 19 is thereby changed over and connected to a contact point a. As a result, the output side of the output signal processing circuit 18 is cut out, and the reproduced signal on a line ld is fed back to the reproducing apparatus 12 by way of a line le.

Next, when the operation device 11 is set to a special reproducing mode such as still reproduction, slow-motion reproduction, or single-frame reproduction, the reproducing apparatus 12 reproduces each track of the disc a plurality times. The switching circuit 19 is changed over in response to the switching pulse from the control unit 15 so that its moving contact is connected to a contact point b. Accordingly, the reproduced signal is now supplied through the line ld to the input signal processing circuit 17, where it is processed into a signal appropriate for storage in the memories, and is thereafter supplied via a line lk to the one-field memory part 16.

The one-field memory part 16 is adapted to select and to store a signal corresponding to one field of the video signal from the input signal processing circuit 17 and then to repeatedly read out the signal thus stored, responsive to a control signal supplied through a line li from the control unit 15. The vertical synchronizing signal is supplied through the line lc from the reproducing apparatus 12. The signal thus read is supplied through a line lm to the output signal processing circuit 18 where it is signal processed so that odd field signals alternate with even field signals. The resulting signal-processed signal is fed through the switching circuit 19 and the line le to the reproducing apparatus 12. The signal supplied to the reproducing unit 12 is fed to a TV receiver 13 where it is reproduced as a special reproduced image picture.

However, since the disc has recorded video signals correspondiing to, for example, four successive fields per track turn, when a given track turn is repeatedly reproduced and the reproduced signals are reproduced as they are, by the receiver 13, the resulting picture as reproduced becomes four images repeated successively every four fields. Accordingly, particularly, in the case where the picture involves rapid motion, the reproduced picture appears to vibrate. In contrast, according to the system of the present invention, only the signal for a predetermined field is reproduced repeatedly to produce a picture corresponding to four fields per track turn. Accordingly, even when the same track turn is repeatedly reproduced, the reproduced image is free from any vibration.

When the operation is switched to a random access reproducing mode, the reproducing apparatus 12 produces a reproduction address signal which is supplied through a line ln to the control unit 15. Moreover, the reproducing apparatus 12 compares the reproduction address signal with a setting address signal to produce a skip pulse which displaces the reproducing transducer.

The one-field memory part 16 may be a unit having an analog memory or a digital memory composed of semiconductor elements, or a unit employing a magnetic disc as in the embodiment described below. Here, if the number of one-field memories provided in the one-field memory part 16 is assumed to be n (where n is an integer greater than two), it is preferable to establish the relationship of $N \geq n$, where N is the number of fields of the video signal recorded on each track turn of the disc. When reduced to practice, a relationship of $N < n$ may be adopted. In the case where the one-field memory part is constituted of magnetic discs, n recording and reproducing heads are disposed for one magnetic disc. With this arrangement, the one-field memory part has a plurality of one-field memories.

Figure 2:
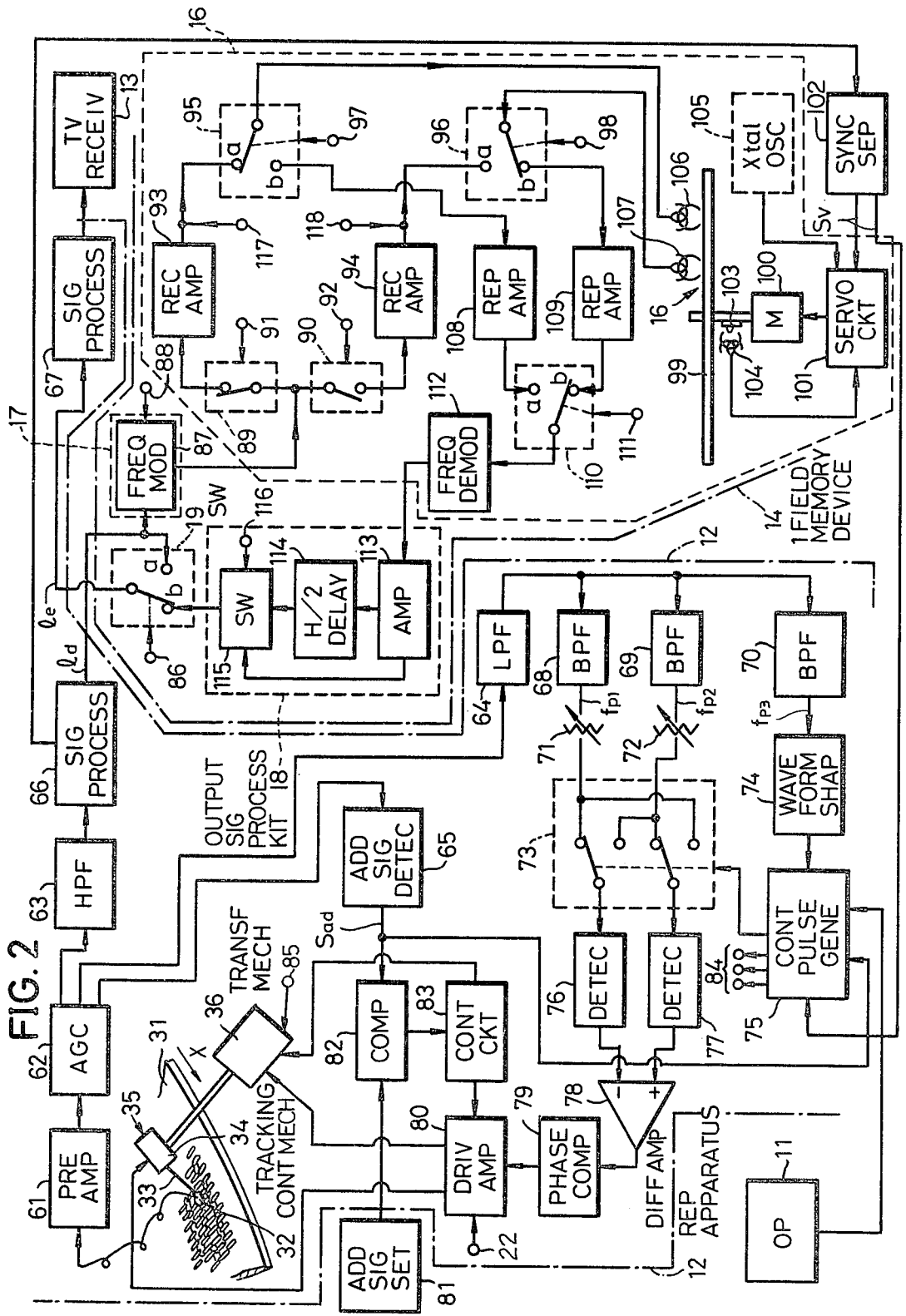
FIG. 2 is a more detailed block diagram of the special reproducing system shown in FIG. 1.

Next, a description is given with respect to a more detailed block diagram of the first embodiment of the special reproducing system of the present invention, in conjunction with FIG. 2. The system depicted in FIG. 2 is based on the same principle as that in FIG. 1.

Figure 3:
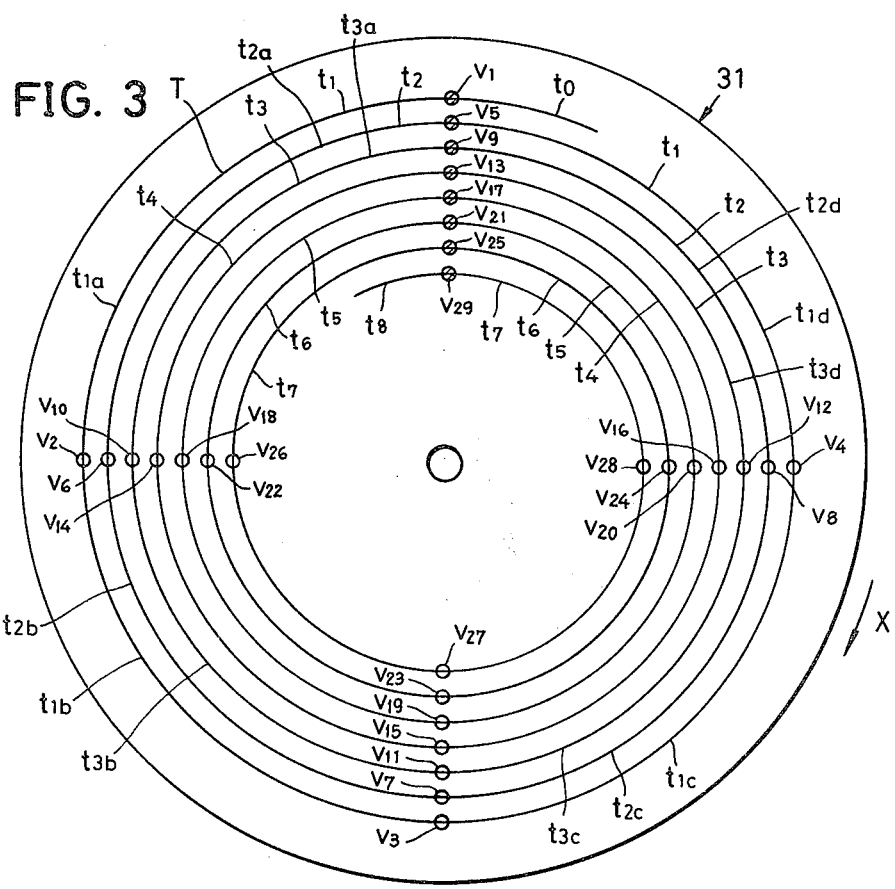
FIG. 3 is a diagrammatic plan view indicating the track pattern of a rotary medium.

A disc 31 to be reproduced by the reproducing apparatus 12 has a video signal recorded on a spiral track constituted of pits responsive to the information content of the signal. The recording is performed using the recording system described in the above listed applications, for example, as indicated in FIG. 3. In the same FIG. 3, track turns t1, t2, t3, ... of the single continuous spiral track T, correspond to individual revolutions of the disc 31. Each track turn is constituted by the formation of pits (not shown) representing the main information signal along a plane track path. No stylus guide groove is formed in the track.

With respect to each track turn t1, t2, t3, ..., in every horizontal scanning period (H) at a position corresponding to the horizontal blanking period, pits (not shown) representing the first pilot signal fp1 are formed on one lateral side of the track as viewed in the track path direction. Pits (not shown) representing the second pilot signal fp2 are formed on the other side of the track. In the middle position between the centerlines of adjacent track turns, only pits of one kind (fp1 pits or fp2 pits) are formed. Moreover, the sides on which the pits are formed are reversed for each successive track turn. That is, if the first (fp1) and second (fp2) reference signal pits are formed respectively on the right and left sides of a given track turn, they will be respectively formed on the left and right sides of the adjacent track turns.

On each individual track t1, t2, ..., there is recorded a video signal for two frames, that is, four fields are recorded per track. The positions of the vertical synchronizing signals of the respective fields are designated by reference characters V1, V2, V3, .... At the position of each vertical synchronizing signal, is recorded an address signal of, for example, 40 bits. Furthermore, a reference signal fp3 is recorded at each of the starting end positions V1, V5, V9, ... of the track turns t1, t2, t3, ....

In FIG. 2, as the disc 31 rotates in the direction indicated by arrow X in a rotational speed of 900 rpm, for example, a reproducing stylus 32 of the reproducing transducer 35 traces along a track and reproduces a recorded signal as variation in the electro-static capacitance between the disc 31 and the reproducing stylus 32 in correspondence with the pit configuration. The reproducing stylus 32 is mounted on the distal end of a cantilever 33 and is trackingly controlled by a tracking control mechanism 34 so as to trace along the track accurately. The reproducing transducer 35 is driven in the radial direction of the disc 31 by means of a carriage 36.

The operation device 11 has a control panel such as that shown in FIG. 4. When a power switch push button 41, a play button 42 and a normal button 47 are pushed in this order, the disc 31 starts to rotate at a predetermined rotational speed. The reproducing transducer 35 is moved by the carriage 36 in the radial direction of the disc so as to travel the distance of one track pitch per revolution of disc. When a fast-forward button 43 is pushed, the reproducing transducer 35 is moved rapidly in the normal direction. When a fast-backward button 44 is pushed, the transducer 35 is moved rapidly in the reverse direction. When a pause button 45 is pushed, the movement of the reproducing transducer 35 is temporarily stopped. If necessary, the reproducing stylus 32 separates from the disc 31. When a reject button 46 is pushed, the reproducing transducer 35 returns to its original pre-operation ready position, and is rendered inoperational.

For slow-motion reproduction, a slow-motion button 48 is pressed. The slow-motion speed is adjusted by rotating a knob 54. Rotation of the knob 54 changes the resistance of a variable resistor to control the frequency of an oscillator and thus setting the slow-motion speed at, for example, between 1/10 and 1/1 of normal reproduction speed. When a still button 49 is pushed, travel of the reproducing transducer 35 comes to a halt and the reproducing stylus 32 repeatedly reproduces the same track.

When a quick-motion reproducing button 50 is pushed, the reproducing transducer 35 travels at a speed which is faster than the speed at the time of normal reproducing mode. At this time, the knob 54 is adjusted to select a quick-motion speed between, for example, one and five times normal reproduction speed.

When a backward button 51 is pushed at the time button 47, 48, or 50 is depressed, the picture can be reversed at normal, slow, or quick reproduction speed. When a forward shift button 52 is pushed at the time when the apparatus is in the still picture reproducing mode (when still button 49 is depressed), the image picture is shifted forward by one frame every time the button 52 is pushed. On the other hand, each time the backward shift button 53 is pressed, the image picture is shifted backward by one frame.

In still reproduction with the reproducing stylus 32 tracing track t1 in FIG. 3, for example, the reproducing stylus 32 will come to a vertical synchronizing signal position V5. At this time, a kick pulse is applied to the tracking control mechanism 34, thus causing the reproducing stylus 32 to jump to the vertical synchronizing signal position V1 and to resume tracing track t1. This operation is repeated so that the reproducing stylus 32 repeatedly reproduces the four-field signal on the track t1. In the system of the present invention, one of the two field signals constituting each frame signal is stored in the memory and is read out repeatedly so that a signal having the same field content is repeatedly supplied to the receiver which thereby produces the still image picture.

At the time of slow-motion reproduction, the reproducing stylus 32 reproduces track t1, for example, a plurality of times, similarly as in the still picture reproducing mode, and then, reproduces the next track t2 a plurality of times. In the same manner, the reproducing stylus 32 thereafter reproduces each succeeding track a plurality of times.

Referring back to FIG. 2, the signal reproduced by the reproducing stylus 32 is supplied through a preamplifier 61 and an automatic gain control (AGC) circuit 62 to a high-pass filter 63, a low-pass filter 64, and an address signal detection circuit 65. The main information signal is led out through the high-pass filter 63 and is frequency demodulated at a signal processing circuit 66. This signal is further processed as required, and is then fed forward through the line 1d. In normal reproducing mode, the moving contact of the switching circuit 19 is in contact with its point a. Accordingly, in this case, the demodulated information signal delivered through the line ld is supplied via the switching circuit 19 and the line le to a signal processing circuit 67, where it is subjected to signal processing, for example, color processing. Then, the resulting processed signal is fed to the TV receiver 13 thereby to reproduce the picture and sound.

The reference signals fp1, fp2, and fp3 are separated at the low-pass filter 64 and are supplied respectively to amplifiers 68, 69, 70. Here, each of the amplifiers 68, 69, and 70 is a kind of band-pass amplifier. The amplifiers 68, 69, and 70 are respectively designed to have steep frequency passing characteristics at only the frequencies fp1, fp2, and fp3. As a result, signals of frequencies fp1 and fp2 are obtained separately from the amplifiers 68 and 69. These signals respectively pass through level adjusters 71 and 72, where their levels are adjusted. The resulting signals are then supplied to a gate switching circuit 73. These reproduced signals fp1 and fp2 are pulse trains respectively having periods corresponding to 2H (where H denotes horizontal scanning period). Moreover, they have a coinciding phase in the horizontal blanking period of the reproduced video signal.

The reference signal fp3 which is separated and amplified in the band-pass amplifier 70 is supplied to a wave-form shaping circuit 74 comprising a Schmitt trigger circuit. There, its wave is shaped so that it is not affected by noise and other influences. The wave-shaped signal is then supplied to a control pulse generating circuit 75. The resulting output switching pulses from this control pulse generating circuit 75 are supplied to the gate switching circuit 73.

The gate switching circuit 73 switches the signals fp1 and fp2 every revolution period of the disc 31 in response to the supplied switching pulses. In the present embodiment of the invention, two frames of the video signal are recorded for each revolution of the disc 31. Therefore, the switching pulse inverts its polarity every two frames (1/15 second). As a result, the gate switching circuit 73 supplies the signals fp1 and fp2 of respectively predetermined polarities to detecting circuits 76 and 77.

The detecting circuits 76 and 77 detect the envelopes of their respective input reference signals and convert the envelopes into DC voltages. These voltages are then supplied to a differential amplifier 78. This differential amplifier 78 compares the output signals of the two detecting circuit 76 and 77 which vary in response to the reproduced levels of the signals fp1 and fp2. This generates an output tracking error signal which indicates the tracking error direction and the error quantity. This error signal passes through a phase compensation circuit 79 and is further amplified to a specific level by a driving amplifier 80.

Then, the output signal of the driving amplifier 80 is applied to the tracking coil of the tracking control mechanism 34 as a control signal thereby to control it. As a result, the cantilever 33 undergoes a displacement, whereby the reproducing stylus 32 is tracking controlled so that the above mentioned tracking error signal becomes zero, that is, so that the stylus 32 correctly traces the track T of the disc 31. Furthermore, the output signal of the driving amplifier 80 is also supplied to the motor driving control circuit of a transferring mechanism 36 and so controls the rotational driving of the motor, which moves the reproducing transducer 35 so that the tracking control is carried out with the cantilever of the reproducing transducer 36 constantly in neutral position.

In random access mode operation, an address signal setting part 81 sets the address in accordance with a predetermined reproduction starting position. An address signal detected by the address signal detection part 65 is compared with the above address signal set by the address signal setting part 81 at a comparator 82. The resulting compared output is supplied to a control circuit 83. The circuit 83 generates an output control signal which is fed to the carriage 36 to rapidly drive the reproducing transducer 35 to a desired address position. Moreover, a kick pulse from the control circuit 83 is supplied to the driving amplifier 80 and controls the tracking control mechanism 30 so that the reproducing stylus 32 rides accurately on the track of the desired address.

Next, a description is given of the operation at the time of a still picture reproducing mode of operation, as one example of the special reproducing modes of operation.

When the still button 49 in the operation device 11 is pushed with the apparatus in a normal reproducing mode, a stop pulse is delivered to a terminal 84 of the control pulse generation circuit 75, and is applied through a terminal 85 to the carriage 36. The carriage 36 thereby stops its operation of driving the reproducing transducer 35. A switching pulse is led out through a terminal 84 of the control pulse generating circuit 75 and is applied to a terminal 86. As a result, the moving contact of the switching circuit 19 is changed over and connected to a contact point b. Furthermore, the control pulse generating circuit 75 generates a kick pulse based on the reference pulse fp3, which kick pulse is applied through terminals 84 and 22 to the driving amplifier 80. Accordingly, the tracking control mechanism 34 operates to rapidly shift the reproducing stylus 32 back to the position V1 whereupon it traces the track t1 and reaches the position V5 in FIG. 3, whereby the reproducing stylus 32 thereafter repeatedly reproduces the same track t1.

The signal which is repeatedly reproduced from the same track by the reproducing transducer 35 and which is then delivered to the signal processing circuit 66 is supplied through the line ld to a frequency modulator 87. This frequency modulator 87, which is operational only during the period of time required for the signal storage (described hereinafter) responsive to the applied pulse, frequency modulates the supplied signal to make it appropriate for the succeeding magnetic recording and reproduction. In the case where the signal supplied from the signal processing circuit 66 is frequency modulated signal, the frequency modulator 87 may be omitted.

The frequency modulated signal is supplied to both switching circuits 89 and 90, which are respectively opened and closed in response to the control pulse applied to the terminals 91 and 92 from the control pulse generating circuit 75. For instance, the switching circuit 89 is kept closed during a period of time corresponding to the field signal reproduced when the reproducing stylus 32 traces a track part t1a between the positions V1 and V2 of the track t1 in FIG. 3, and thereby serves to supply the signal to a recording amplifier 93. On the other hand, the switching circuit 90 is kept closed during the period of time corresponding to the field signal reproduced when the reproducing stylus 32 traces a track part t1c between the positions V3 and V4 of the track t1, and thereby serves to supply the signal to another recording amplifier 94.

The signal amplified by the recording amplifier 93 (hereinafter referred to as the "first channel signal") is applied to a contact point a of the switching circuit 95. The signal amplified by the recording amplifier 94 (hereinafter referred to as the "second channel signal") is applied to a contact point a of a switching circuit 96. The switching circuits 95 and 96 are respectively operated responsive to pulses applied to terminals 97 and 98 from the control pulse generating circuit 75, in such a manner that their moving contacts are connected to their contact points a at the time of storage mode, and to their contact points b at the time of read out mode.

In the present embodiment, a memory part using a magnetic disc is employed as the one-field memory part 16. A magnetic disc 99 is rotated by a motor 100 which is controlled to rotate at a specific speed (for example, 3600 rpm) by a disc servo circuit 101. The video signal from the signal processing circuit 66 is supplied to a synchronizing signal separation circuit 102, where its vertical synchronizing signal is separated. A permanent magnet 103 fixed to a rotary shaft of the motor 100 and a pickup head 104 cooperate to detect the rotational speed of the motor 100. A disc servo circuit 101 is supplied with both the separated vertical synchronizing signal and the detected rotation detection signal, and thereby controls the motor 100 so as to rotate at a constant rotational speed. Instead of using the separated vertical synchronizing signal, a crystal oscillator 105 may be used.

Stationary magnetic recording and reproducing heads 106 and 107 are disposed to confront the magnetic surface of the magnetic disc 99. Each of the magnetic heads 106 and 107 is adapted to record the video signal corresponding to one field along a complete circular track on the magnetic disc 99 during rotating in one full turn thereof, and to reproduce the recorded video signal therefrom. In the mode for normally reproducing the disc 31, the moving contacts of the switching circuits 95 and 96 are respectively connected to their contact points a. Each track turn has four fields recorded thereon. Hereinafter, a track part t1a (t2a, t3a, t4a, . . . ) between the vertical synchronizing signal positions V1 (V5, V9, V13, . . . ) and V2 (V6, V10, V14, . . . ) is referred to as "first field part", a track part t1b (t2b, t3b, t4b, . . . ) between the positions V2 (V6, V10, V14, . . . ) and V3 (V7, V11, V15, . . . ) as "second field part", a track part t1c (t2c, t3c, t4c, . . . ) between the positions V3 (V7, V11, V15, . . . ) and V4 (V8, V12, V16, . . . ) as "third field part", and a track part t1d (t2d, t3d, t4d, . . . ) between the positions V4 (V8, V12, V16, . . . ) and V5 (V9, V13, V17, . . . ) as "fourth field part". The period of time when the reproducing stylus 32 is reproducing each field part of the first through fourth field parts is respectively referred to as "first field period", "second field period", "third field period", and "fourth field period".

The switching circuit 89 closes only during the second field period. The switching circuit 90 closes only during the fourth field period. The terminal 117 receives the erasing signal during the first field period. The terminal 118 receives the erasing signal during the third field period. The first channel magnetic head 106 erases the recorded signal during the first field period, and records (memorize) the reproduced signal of the second field part along the complete circular first channel track on the magnetic disc 99 during the following second field period. The second channel magnetic head 107 erases the recorded signal during the third field period, and records (memorize) the reproduced signal of the fourth field part along the complete circular second channel track on the magnetic disc 99 during the fourth field period. During the mode of normal reproduction of the disc 31, the operation described above is repeated.

When the still button 49 is pushed at any optional time instant in the normal reproducing mode of operation, the one-field memory device 14 continues the above described recording (memorizing) operation which has been performed during the normal reproducing mode of operation until the reproducing stylus 32 reaches the position V1 (V5, V9, V13, . . . ) where the reference signal fp3 has been recorded, as will be described in detail with reference to FIG. 6. When the reproducing stylus 32 reaches the position V5 (V9, V13, . . . ), it shifts to the position V1 (V5, V9, . . . ) and thereafter traces the same track repeatedly. Accordingly, at the time instant when the reproducing stylus 32 is shifted at the above described position, the switching circuits 95 and 96 are switched over and connected to their contact points b, and the switching circuit 110 is also switched over and connected to its contact point b. As a result, the signal of the fourth field part which has been recorded by the magnetic head 107 immediately before the reproducing stylus 32 was shifted is repeatedly reproduced (read out) by the magnetic head 107, and is led out by way of a reproducing amplifier 109, and a switching circuit 110.

The signal from the switching circuit 110 is supplied to a frequency demodulator 112, wherein it is frequency demodulated. The resulting demodulated signal is fed to an amplifier 113 in the output signal processing circuit 18. The amplified output signal is fed, on the one hand, directly, and on the other hand, through a H/2 (H denotes a horizontal scanning period) delay line 114, to a switching circuit 115. The switching circuit 115 is switched over responsive to a switching pulse applied to a terminal 116, and operates to alternately pass therethrough the signal from the amplifier 113 and the H/2 delayed signal from the H/2 delay line 114. Accordingly, from the switching circuit 115, are alternately derived in succession the fourth field signal reproduced by the magnetic head 107, and the signal obtained by delaying the fourth field signal by H/2 so as to interlace with the fourth field signal which has not passed through the H/2 delay line.

The signal delivered at the switching circuit 115 is fed through the switching circuit 19 with its moving contact connected to the contact b and the line le to the line signal processing circuit 67. Accordingly, in the TV receiver 13, the information contents of the fourth field scan to interlace each other, and the still-picture is thus reproduced.

A modification wherein the number n of one-field memory elements incorporated in the one-field memory part 16 is increased may be made by correspondingly increasing the number of magnetic heads for recording and reproducing signals on and from the magnetic disc 99.

As set forth above, the present embodiment is arranged so as not to reproduce four fields signals in repetition, but to reproduce successively only the information content of the fourth field signal, for example, picked out from the four field signals. As a result, it becomes possible to reproduce the still-picture in which no vibratile motion takes place.

FIG. 5 shows another embodiment of the one-field memory device 14. In FIG. 5, those parts which are the same as the corresponding parts in FIG. 2 are designed by like reference numerals. A detailed description of such parts will be omitted.

The signal which is delivered to the signal processing circuit 66 via a terminal 128 passes through the switching circuit 89 or 90 and is supplied to an analog-to-digital (A/D) converter 121 or 122, where it is converted to a digital signal. The resulting converted signal is memorized in a digital memory 123 or 124, and is then read out. The read-out signal is converted to an analog signal by a digital-to-analog (D/A) converter 125 or 126. The A/D converter 121, the digital memory 123, and the D/A converter 125 together constitute the single one-field memory 16a. The A/D converter 122, the digital memory 124, and the D/A converter 126 constitute another single one-field memory 16b. The one-field memories 16a and 16b respectively store one predetermined field, responsive to a control signal applied through a bus 127.

The signals repeatedly read out by one-field memories 16a and 16b are respectively supplied to the reproducing amplifiers 108 and 109. In the present embodiment, since the magnetic recording and reproducing are not used for memorizing, the frequency modulator 87 and the frequency demodulator 112 are not used. This is different from the above described embodiment.

Next, a description is given in connection with a detailed block diagram of one embodiment of the control pulse generation circuit 75, in conjunction with FIG. 6. This circuit 75 generates control pulses which are supplied to the terminals 85, 86, 22, 88, 91, 92, 97, 98, 111, and 116, as described in connection with FIG. 2.

The operation device 11 has switches 131, 132, 133, 134, 135, and 136 which are respectively opened or closed when the buttons 47, 48, 49, 50, 52, and 53 are pushed, and switches 137a and 137b which are changed over to intercoupled operation when the button 51 is pushed. Further, the operation device 11 is provided with a variable resistor 138 controlled by the knob 54 and with a changeover switch 139 connected to the variable resistor 138.

A terminal 140 receives a vertical synchronizing signal SV (FIG. 7(H)) from the synchronizing signal separation circuit 102 in FIG. 2. Another terminal 141 receives a pulse P3 formed in response to the reference signal fp3 from the waveform shaping circuit 74.

A normal gate circuit 142 receives both an on-off signal (FIG. 7(B)) from the switch 131 which is opened and closed by operating the normal button 47, and the pulse P3 introduced through the terminal 141. The normal gate circuit 142 generates an output signal P2 (FIG. 7(C)), the level of which changes at the position of the initial pulse P3 after the level of the on-off signal from the switch 131 has varied. The signal P2 is supplied, on the one hand, to a gate circuit 143, and, on the other hand, passes through an output terminal 84a of the terminal group 84 and is applied, as a switching signal, to the terminal of switching circuit 19. The gate circuit 143 delivers at one terminal 144a thereof a pulse P3 from the terminal 141, as indicated in FIG. 7(D), when the supplied signal P2 assumes its high level in the normal reproducing mode. The gate circuit 143 delivers the pulse P3, as indicated in FIG. 7(E), at another terminal 144b thereof when the signal P2 assumes its low level in still-picture reproducing mode.

The pulse P3 from the output terminal 144a passes through an OR circuit 145, and is then delivered, as a switching pulse P4 indicated in FIG. 7(F), to an output terminal 84h and is thereafter applied to the gate switching circuit 73, which switches. The output pulse P4 of the OR circuit 145 is also supplied to a gate pulse generator 146, which also receives the vertical synchronizing signal SV from the terminal 140. This gate pulse generator 146 is adapted to generate a gate signal P5 (FIG. 7(G)) the level of which is changed to the high level whereupon the pulse P4 and the vertical synchronizing signal SV are introduced concurrently. The high level is maintained for four field periods thereafter. The pulse P5 is supplied to an erasing and recording pulse generator 147.

A shift register 148 is supplied with the pulse P3 and the vertical synchronizing signal SV, and operates to generate four pulse trains P6 through P9 as indicated in FIGS. 7(I) through 7(L). The pulse of each pulse train has the repetitive period of one vertical blanking period (1V) and a phase which is determined by the pulse P3. The erasing and recording pulse generator 147 gates the pulse trains P6 through P9 from the shift resistor 148 in response to the gate signal P5, and delivers them (as pulses P6e, P7r, P8e, and P9r indicated in FIGS. 7(M) through 7(P)) to the output terminals 84c through 84f. The pulses P6e and P8e delivered at the terminals 84c and 84e are used to determine timing of the erasing pulse applied to the terminals 117 and 118 in FIG. 2. The pulse P7r delivered to the terminal 84d is applied to the terminals 91 and 97 of the switching circuits 89 and 95 in FIG. 2. The pulse P9r delivered to the terminal 84f is applied to the terminals 92 and 98 of the switching circuits 90 and 96.

The pulses P7r and P9r are also supplied to the pulse generator 149 which receives the signal P2. The pulse generator 149 generates a signal P1 (FIG. 7(Q)) which assumes a high level during the period of time when the signal P2, in the normal reproducing mode of operation, is a high level, and is also made a high level only when the pulses P7r and P9r are applied in the other mode of operation. This signal P1 is led out of the terminal 84b and is then applied to the terminal 88 in FIG. 2.

FIG. 7 shows waveforms of individual signals when the reproducing apparatus continues a normal reproducing mode of operation until the time instant t1 and is then switched to a still-picture reproducing mode responsive to a pushing of the still button 49 at this time instant to restore the normal button 47.

When the reproducing apparatus is in a normal reproducing mode, the pulse P4 is delivered to the output terminal 84h and is supplied to the gate switching circuit 73. Moreover, responsive to the pulses P6e through P9r supplied from the output terminals 84c through 84f to the one-field memory device 14, the latest first and second channel signals are successively stored on the magnetic disc 99 in place of the stored channel signals.

When the still button 49 is pushed at the time instant t1, the pulse P4, and P6e through P9r being delivered at the terminals 84h and 84c through 84f cease to exist after the time instant t2 of the pulse P3 which appears immediately after the time instant t1. The signal P2 is led out of the terminal 84a and is applied to the terminal 85 of the carriage 36, and the travel of the reproducing transducer is thereby stopped at the time instant t2. The signal P2 is also applied to the terminal 86 of the switching circuit 19, the moving contact thereof being changed over from the contact point a to the contact point b at the time instant t2.

In a slow-motion reproduction or still-picture reproduction mode, the utilization condition of the signal may be read from two one-field memories in the one-field memory device at a time when utilization is not appropriate. There sometimes occurs a problem in that the picture initially appearing as the reproduced picture is a picture stored previously. As a countermeasure against this, the present embodiment is arranged so that, when changeover has been made from the normal reproducing mode to the still-picture reproducing mode, the second channel signal which has been stored and read by the magnetic head 107 is reproduced as the picture.

Referring to FIG. 6, a channel switching signal forming circuit 150 receives the pulses P8e and P9r and forms a switching signal P10 (FIG. 7(R)), which is fed through an output terminal 84g to the terminal 111 of the switching circuit 110. The moving contact of the switching circuit 110 is connected to the contact point a when the pulse P10 assumes a high level and is changed over to the contact point b when the pulse P10 assumes a low level. Therefore, when changed over from the normal reproducing mode to the still-picture reproducing mode, the signal supplied from the one-field memory device 14 to the TV receiver 13 is in all cases a second channel signal reproduced by the magnetic head 107.

The pulse train is delivered to the output terminal 144b of the gate circuit 143 after the time instant t2, when the pulse P3 initially appears following the time instant t1 to changeover from the normal reproducing mode to the still-picture reproducing mode. The pulse train passes a kick pulse generation circuit 151 and is then delivered as a kick pulse P11 (FIG. 7(S)) to an output terminal 84i. This kick pulse P11 is supplied through the driving amplifier 80 to the tracking control mechanism 34. Responsive to this kick pulse P11, the reproducing stylus 32 is kicked back or skipped, for example, from the position V5 to the position V1 on the track turn t1, thus making it possible to trace the same track t1 repeatedly.

Figure 8:
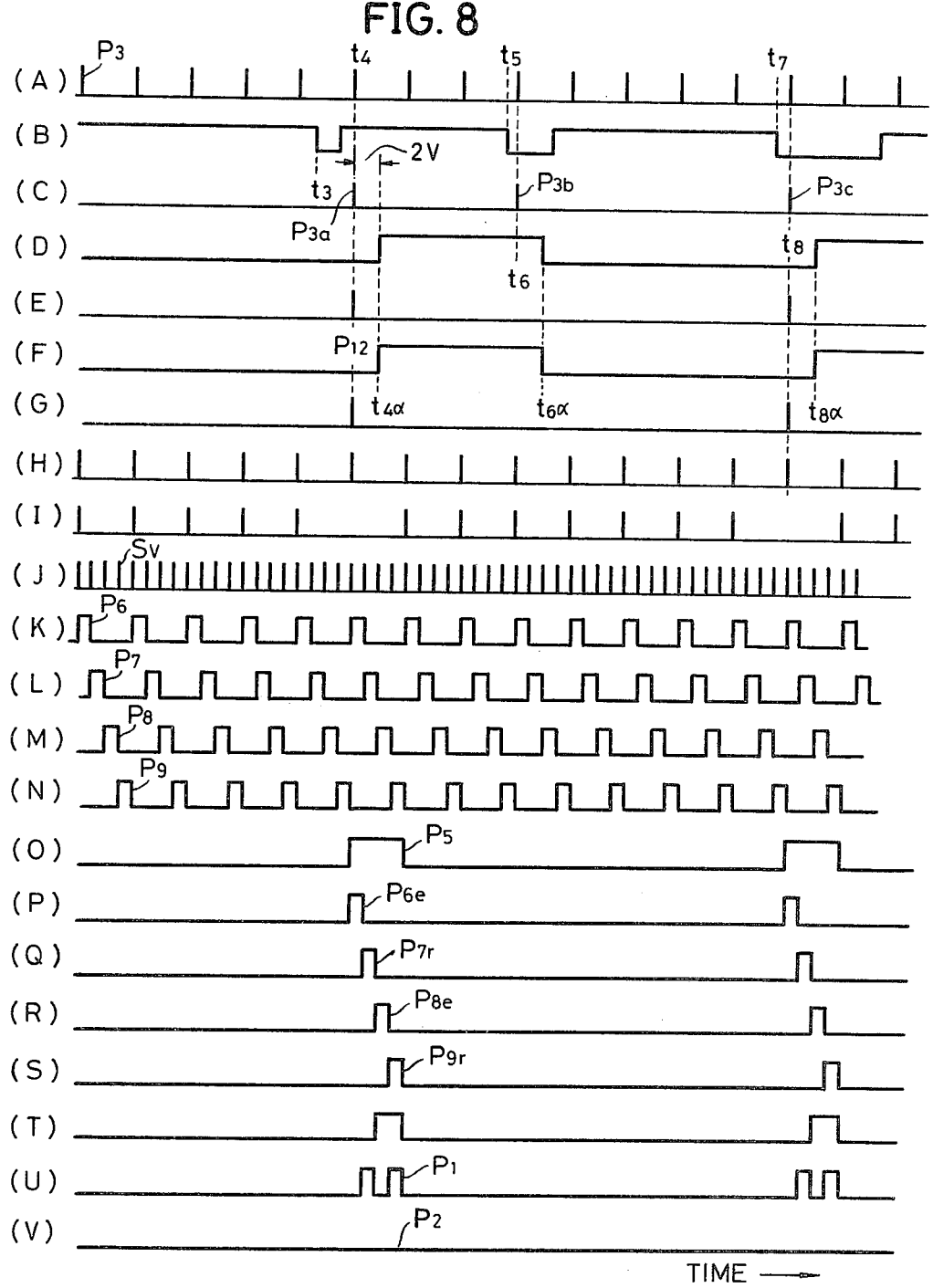

When the forward-shift button 52 is pushed at a time instant t3, in a still-picture reproducing mode, the switch 135 is closed while the button 52 is being pushed. Ground potential is applied, through the switch 133 which is closed due to a preceding pushing of the still button. The ground potential passes to a forward-shift pulse generator 152, as indicated in FIG. 8(B). The forward-shift pulse generator 152 sends only a single pulse P3 initially appearing after the time instant t3, that is, the pulse P3 at a time instant t4 in FIG. 8(A), is a forward shift pulse P3a indicated in FIG. 8(C). This pulse P3a is supplied to a channel changing pulse generator 153 and a forward switching pulse generator 154. Both of the generators 153 and 154 also receive the channel switching signal (FIG. 8(D)) from the channel switching signal forming circuit 150. This channel changeover signal is kept at a low level after the time instant t2 as has been described with reference to FIG. 7(R), and thereby is at low level at the time instants t3 and t4.

The forward switching pulse generator 154 undergoes a switching operation in such a manner that the pulse from the generator 152 is led to the OR circuit 155 when the channel switching signal from the circuit 150 is at a low level, and is not led to the OR circuit 155 when the channel switching signal is at a high level. Accordingly, the forward-shift pulses P3a, P3b, and P3c (FIG. 8(C)) are generated in the forward-shift pulse generator 152 at time instants t4, t6, and t8, responsive to a temporarily closing of the switch 135 due to a pushing of the forward shift button 52 at time instants t3, t5, and t7 in FIG. 8. The pulses P3a and p3c generated at the time instants t4 and t8 pass the pulse generator 154 and are fed to the OR circuit 155. Since the signal applied to the pulse generator 154 from the circuit 150 is of a high level at the time instant t6, the pulse generated at this moment is prevented from passing the pulse generator 154 and is therefore not supplied to the OR circuit 155. Therefore, the pulse generator 154 supplies the pulses indicated in FIG. 8(E) to the OR circuit 155.

The pulses which have passed the OR circuit 155 are then passed through the OR circuit 145 and are led out of the output terminal 84h as the switching pulses indicated in FIG. 8(G). The output of the OR circuit 155 is also supplied to the kick pulse generation circuit 151 which is an exclusive OR circuit. To one input terminal of the kick pulse generation circuit 151, is applied an output pulse (FIG. 8(E)) of the OR circuit 155, and to another input terminal is applied the pulse train (FIG. 8(H)) from the output terminal 144b of the gate circuit 143. Accordingly, a pulse train which lacks pulses at the time instants t4 and t8, as indicated in FIG. 8(I), is led out of the output terminal 84i as a kick pulse, and is applied to the terminal 22 in FIG. 2.

Since the kick pulse indicated in FIG. 8(I) lacks pulses at the time instants t4 and t8, the reproducing stylus 32 is not kicked back at these time instants. Moreover, at these time instants t4 and t8, the switching pulse (FIG. 8(G)) is supplied from the output terminal 84h to the gate switching circuit 73, when the pulse polarity is changed over. Therefore, at the time instants t4 and t8, the reproducing stylus 32 is shifted from the track turn being traced up to this time and starts to trace the following track turn. Moreover, since no pulse is present at the time instant t6, the reproducing stylus 32 continues to trace the same track. Therefore, when shifting in the forward direction in a still-picture reproducing mode, the reproducing stylus 32 shifts in the forward direction by one track pitch whereupon the pushing operation connected from the initial pushing operation corresponds to the odd ordinal i.e., 1st, 3rd, . . . , and continues to trace the same track whereupon the pushing operation corresponds to the even ordinal.

The channel changing pulse generator 153 produces as output a signal P12 (FIG. 8(F)) the level of which is inverted every time the pulses P3a, P3b, P3c, . . . are applied thereto from the generator 152 at the time instants t4α, t6α, and t8α elapsed for the time corresponding to 2-vertical blanking periods after the time instants t4, t6, t8 of the pulses.

The information signal is delivered at the one-field memory device 14, which is the second channel signal reproduced by the magnetic head 107 as described above during the still-picture reproducing mode of operation. This information signal is controlled to be the first channel signal whereupon the operation of pushing the forward shift button 52 corresponds to operation of an odd ordinate number of times, and to be the second channel signal whereupon the pushing operation corresponds to the operation of an even ordinate number of times. For instance, when the forward shift button 52 is pushed a plurality of times when the reproducing stylus 32 is reproducing the track turn t1, pictures can be reproduced in which the information contents of the track parts t1*d*, t2*b*, t2*d*, t3*b*, t3*d*, . . . are shifted by one scene frame.

That is, the switching pulse (FIG. 8(G)) led out of the OR circuit 145 is also supplied to the gate pulse generator 146. This gate pulse generator 146 generates a gate pulse P5 (FIG. 8(O)) having a width of 4-vertical blanking periods, which pulse is supplied to the erasing and recording pulse generator 147. Responsive to this, the generator 147 generates the pulses P6*e* through P9*r* indicated in FIGS. 8(P) through 8(S). FIGS. 8(J) through 8(N) show respectively the vertical synchronizing signal SV and the pulses P6 through P9, which correspond to those signals indicated in FIGS. 7(H) through 7(L). The pulses P6*e* through P9*r* led out of the output terminals 84*c* through 84*f* are fed to the one-field memory device 14 whereupon the forward shift button 52 is pushed for an odd ordinate number of times. In this one-field memory device 14, the information signal reproduced from a specific region of a new track turn position-shifted in the forward direction on the disc 31 is stored in two one-field memories in response to pushing an odd ordinate number of times.

In the channel switching signal forming circuit 150, a pulse (FIG. 8(T)) is provisionally formed based on both the pulses P8*e* and P9*r*, and then, a channel changeover pulse (FIG. 8(D)) is formed. The level of the changeover pulse is changed from a low level to a high level responsive to the above provisional pulse. The channel switching signal is delivered to the output terminal 84*g*, and is then applied to the terminal 111 in FIG. 2. In the one-field memory part 16, the moving contact of the switching circuit 110 is changed over to the contact point a at the time instant t4*a* whereupon the storing of the new information signal on the magnetic disc 99 is completed by means of the magnetic head 106. The first channel signal is supplied to the frequency demodulator 112. The moving contact of the switching circuit 110 is changed back to the contact point b at the time instant t6*a* elapsed for 2-vertical blanking periods from the time position t6 of the pulse P3 (P3*b*) immediately after the time instant t5 when the succeeding pushing of the forward shift button 52 takes place. Therefore, following this, the second channel signal is delivered to the one-field memory device 14. FIG. 8(U) shows a pulse P1 fed to the output terminal 84*b*, and FIG. 8(V) shows a pulse P2 fed to the output terminal 84*a*.

Next, a description is given of how the apparatus operates when the backward shift button 53 is pushed in the still-picture reproducing mode. Referring to FIG. 9, it will be supposed that the backward shift button 53 is pushed at time instants t9, t12, and t15. When the button 53 is pushed at the time instant t9, the switch 136 is closed while the button 53 is being pushed. Ground potential (FIG. 9(B)) is applied via the switch 133 which has already been closed and the switch 136 to a backward-shift pulse generator 156. This backward-shift pulse generator 156 generates as output a backward-shift pulse P3*sa* (FIG. 9(D)) in response to a single pulse P3*s* (which corresponds to a pulse P3*s* at the time instant t10 in FIG. 9(C)) initially applied thereto from the timing pulse generator 157 after the time instant t9 when the button 53 was pushed. That is, the timing pulse generator 157 generates, based on the pulse P3 (FIG. 9(A)) applied through the terminal 141 and the vertical synchronizing signal SV applied through the terminal 140, the timing pulse P3*s* which has the same repetition period as that of the pulse P3 and is positioned delayed by 2-vertical blanking periods from the pulse P3.

The backward-shift pulse generator 156 delivers the backward-shift pulses P3*sa*, P3*sb*, and p3*sc* as indicated in FIG. 9(D) every time the backward shift button 53 is pushed. The pulses thus delivered are fed to the channel changing pulse generator 153 and a backward switching pulse generator 158. Both of the generators 153 and 158 also receive channel changeover pulse (FIG. 9(E)) from the channel switching signal forming circuit 150. The backward switching pulse generator 158 is arranged to pass the pulses P3*a*, P3*b*, . . . therethrough only when the channel changeover pulse assumes its high level. Therefore, the generator 158 delivers, as a backward-shift pulse as shown in FIG. 9(F), the pulse P3*sb* which is generated from the backward-shift pulse generator 156 responsive to a pushing of the button 53 at even ordinate number times, and the pulse P3*sb* thus delivered is fed to the OR circuit 155.

The channel changing pulse generator 153 generates as output the signal P12 indicated in FIG. 9(G) every time when the backward-shift pulse P3*sa*, P3*sb*, . . . (FIG. 9(D)) are applied thereto. The level of the signal P12 is inverted at time instant t11, t14, and t17 elapsed for the time corresponding to 2-vertical scanning period from time instant t10, t13, and t16 when the above backward-shift pulses are applied thereto.

The backward-shift pulse (FIG. 9(F)) fed from the backward switching pulse generator 158 to the OR circuit 155 is then passed through the OR circuit 145, and is delivered as a switching pulse (FIG. 9(H)) to the output terminal 133. The output pulse from the OR circuit 155 is also supplied to the kick pulse generation circuit 151. Here, since the kick pulse generation circuit 151 is an exclusive OR circuit as described above, the kick pulse (FIG. 9(J)) which corresponds to the sum of the pulse (FIG. 9(I)) supplied from the output terminal 144*b* of the gate circuit 143 and the pulse (FIG. 9(H)) supplied from the OR circuit 155 is led out of the output terminal 84*i*.

The pulse (FIG. 9(H)) delivered at the OR circuit 145 controls the gate pulse generator 146, which thereby supplies a gate pulse P5 having a pulse width of 4-vertical scanning periods (FIG. 9(P)) to the erasing and recording pulse generator 147. FIGS. 9(L) through 9(O) respectively show pulses P6 through P9, which are the same as those indicated in FIGS. 7(I) through 7(L) and FIGS. 8(K) through 7(L). The pulse generator 147 delivers pulses P6*e* through P9*r* (FIG. 9(Q) through FIG. 9(T)) to the output terminals 84*c* through 84*f*. FIG. 9(U) shows the output pulse of the channel switching signal forming circuit 150. FIG. 9(V) shows the pulse P1 led out of the output terminal 84*b*. FIG. 9(W) shows the signal P2 led out of the output terminal 84*a*.

As is apparent from the description set forth above, when the backward shift button 53 is pushed during the still-picture reproducing mode of operation, responsive to odd ordinate pushing operation, the reproducing stylus 32 continues to trace the same track turn. The signal led out via the switching circuit 110 changed over in the one-field memory device 14 is changed from the second channel signal to the first channel signal. Meanwhile, responsive to an even ordinate pushing operation, the reproducing stylus 32 is kicked back at two positions, i.e., the position V1, V5, V9, . . . , and another position V3, V7, V11, . . . in FIG. 3, thereby shifting backward by one track pitch to an outer track and tracing this outer track repeatedly. In the one-field memory device 14, the signal reproduced from the new track is memorized and then the second channel signal is read out and delivered. Therefore, when the backward shift button 53 is pushed a plurality of times when the reproducing stylus 32 is repeatedly reproducing the track turn t3 in FIG. 3, for example, it becomes possible to obtain a picture reproduced successively from the track parts t3d, t3b, t2d, t2b, t1d, tdb, . . . , that is a picture is shifted by ones in the backward direction.

When the slow-motion button 48 is pushed, the switch 132 is closed and the switch 139 is connected to the contact point a. A slow pulse generator 159 generates a pulse with a repetition cycle corresponding to a slow-motion ratio set by adjusting the variable resistor 138 by the knob 54. The pulse thus generated is supplied through the contact point b or f of the switch 137a to either the backward-shift pulse generator 156 or the forward-shift pulse generator 152. Accordingly, the above described one-frame shifting operation is automatically carried out in repetition responsive to the output pulse of the slow pulse generator 159. The slow-motion picture in the forward direction or backward direction is obtained in the slow-motion ratio determined by the variable resistor 138.

When the quick-motion button 50 is pushed, the switch 132 is closed and the switch 139 is changed over to be connected to the contact point b. A quick pulse generator 160 generates a pulse with a repetition cycle corresponding to a quick-motion ratio set by adjusting the variable resistor 138. The pulse thus generated is supplied via the contact point b or f of the switch 137b to either the backward-shift pulse generator 156 or the forward-shift pulse generator 152. Accordingly, the repetitive one-frame shifting operation is automatically carried out responsive to the output pulse of the quick pulse generator 160. The quick-motion picture in the forward direction or backward direction is obtained in the quick-motion ratio determined by the variable resistor 138. The switches 137a and 137b are changed over to the contact point b or f in an intercoupled operation when the backward button 51 is manually operated.

Further, this invention is not limited to these embodiments. Variations and modifications may be made without departing from the scope of the invention.

What we claim is:

1. A system for reproducing still or slow-motion television pictures responsive to reproduced signals from a rotary recording medium, said rotary recording medium having a video signal recorded on a spiral main track with first and second reference signals recorded on a subtrack, said subtrack being formed between successive track turns of the main track and having only one of the first and second reference signals recorded on a per one track turn basis, the first and second reference signals being interchanged with each other on each successive track turn, a third reference signal being recorded at a position where the first and second reference signals interchange the sides of the main track on which they are recorded, a plurality of fields of the video signal being recorded on the rotary recording medium in each one track turn of the main track, each field of the plurality of fields of the video signal being preceded by a vertical synchronizing signal, said third reference signal being recorded on the rotary recording medium along with one of said vertical synchronizing signals in each track turn, said reproducing system comprising:

operating part means comprising a plurality of control buttons for selecting a desired mode of operation, the mode of operation including at least a normal reproduction mode and a special reproduction mode, said normal reproduction mode being a mode in which the recorded signals are reproduced from the rotary recording medium at a rate of picture motion which is the same as the rate at which the signals were originally recorded, said special reproduction mode being a mode in which the recorded signals are reproduced from the rotary recording medium at a rate of picture motion which is different from the rate at which the signals were originally recorded, said operating part means producing a predetermined mode selection signal in response to a manipulation of a predetermined control button among said plurality of control buttons;

reproducing means including a reproducing element for scanning over the tracks on the rotary recording medium to pick up the recorded signals;

first separating means for separating the first through third reference signals from signals which are reproduced by said reproducing means, and for separately producing the first through third reference signals and the video signals within the reproduced signals;

second separating means for separating the vertical synchronizing signal from the video signal which is produced from said first separating means;

control pulse generating means for generating a plurality of control pulses in response to the mode selection signal from said operating part means, the third reference signal which is separated in said first separating means, and the vertical synchronizing signal which is separated in said second separating means;

tracking control signal forming means for forming a tracking control signal in response to the first and second reference signals which are separated in said first separating means and a control pulse from said control pulse generating means;

tracking control means responsive to the tracking control signal from said tracking control signal forming means for controlling the tracking of said reproducing element, said tracking control means controlling said reproducing element to repeatedly scan over the same track turn a plurality of times during the special reproduction mode;

switching means responsive to a control pulse from said control pulse generating means, said video signal being supplied from said first separating means to said switching means;

memory means for selectively storing at least one field of video signal among the plurality of fields of video signal in one track turn of the main track which are supplied thereto from said second separating means, said memory means selectively reading one stored field of the video signal and supplying the read out video signal to said switching means; and signal processing means connected to said switching means for processing the video signal read out from said memory means to produce a television signal for driving a television receiver, said control pulse generating means enabling said switching means to pass the video signal from said first separating means to said signal processing means in the normal reproduction mode, and generating a control pulse which causes said switching means to pass the read-out signal from said memory means in response to a special reproduction mode selection signal, said memory means comprising a memory control part, a memory part, and a signal processing part, said control pulse generating means generating control pulses which cause said memory control part to selectively supply at least one field of video signal in one track turn of the main track to said memory part for storage, said control pulse generating means generating control pulses which cause said memory control part to selectively read out one stored field of the video signal from the memory part in response to the special reproduction mode selection signal from said operating part, said control pulses which cause said selective read-out from said memory part being generated only after said control pulse generating means receives the third reference signal from said first separating means after having received the special reproduction mode selection signal, said signal processing part processing said one field of the video signal read out from said memory part into a processed video signal in which two interlaced fields are made up from the same one field of the video signal, and supplying the processed video signal to said switching means.

2. The reproducing system as claimed in claim 1 in which said memory control part selectively supplies to said memory part specific fields of the video signal which are different from each other, said selected video signal being taken from among the plurality of fields of video signal picked up from each track by said reproducing element, said memory part being made up from a plurality of memory devices respectively for storing and reading the specific field of the video signal, and said signal processing part selectively processes one specific field of the video signal from among different fields of the video signal to thereby produce a processed video signal related to a still picture.

3. The reproducing system as claimed in claim 2 in which said memory devices are constituted by a combination of recording and reproducing magnetic heads and a rotary magnetic disc rotating with a period equal to one field period of the reproduced video signal, said magnetic heads recording the selected specific fields of the video signal on their associated respective tracks on said rotary magnetic disc while successively erasing any signals which may have been previously recorded thereon, and repeatedly reproducing the signal thus recorded during a special reproduction mode.

4. The reproducing system as claimed in claim 2 in which each of said memory devices comprises means for converting the specific fields of the video signal which are different from each other from an analog to a digital signal, digital memory means for storing and reading out said converted signal, and means for reconverting said read out digital signal from a digital to an analog signal.

5. The reproducing system as claimed in claim 2 in which said reproducing element normally moves in a forward direction across said rotary recording medium, said operating part means comprises a button for causing said reproducing element to shift from one track to a subsequent track as the reproducing element scans over said tracks in said forward direction responsive to every manual operation thereof, thereby causing a forward-shift during a still reproduction mode, and said signal processing part selectively processes the other specific fiels of the video signal among said different fields of the video signal, when the forward-shift occurs.

6. The reproducing system as claimed in claim 2 in which said reproducing element normally moves in a forward direction across said rotary recording medium, said operating part means comprises a button for causing said reproducing element to shift backwardly by one track and to scan over the original backwardly positioned track responsive to every manual operation thereof, thereby causing a backward-shift during a still reproduction mode, and said signal processing means selectively and alternately processes mutually different specific fields of the video signal among said different fields of the video signal, when the backward-shift occurs.

7. The reproducing system as claimed in claim 1 in which said rotary recording medium has four fields of the video signal recorded in one track turn of the main track, said memory control part selectively supplies to said memory part second and fourth fields of the video signal which are reproduced from among said four fields of the video signal, said memory part being made up from two memory devices respectively for storing and reading the selected fields of the video signal, said memory control part comprising a switching circuit for selectively passing the fourth field of the video signal which is read out from one of said memory devices in the special reproduction mode, and said signal processing part selectively processes the fourth field of the video signal from said switching circuit to thereby produce a processed signal related to a still picture.

8. The reproducing system as claimed in claim 1 in which said one field of the video signal stored in said memory part is successively renewed during the normal production mode, and the successive renewal of the one field of the video signal stored in said memory part is interrupted when said control pulse generating means receives the special reproduction mode selection signal and the third reference signal to cause the selective read out from said memory part.

9. The reproducing system as claimed in claim 1 in which said control pulse generating means generates a control pulse which causes said tracking control signal forming means to supply a tracking control signal to said tracking control means so that the reproducing element is controlled to repeatedly scan a plurality of times over the same track turn in response to the special reproduction mode selection signal and the third reference signal.

* * * * *